United States Patent [19]

Breeden

[11] Patent Number: 4,994,797

[45] Date of Patent: Feb. 19, 1991

[54] METHOD AND SYSTEM FOR USER CONTROLLED PAGE DISPOSITION

[75] Inventor: Robert L. Breeden, Boynton Beach, Fla.

[73] Assignee: Motorola, Inc., Schaumburg, Ill.

[21] Appl. No.: 320,659

[22] Filed: Mar. 8, 1989

[51] Int. Cl.⁵ .......................... G08B 5/22; H04M 1/56
[52] U.S. Cl. .......................... 340/825.44; 340/825.47; 379/142
[58] Field of Search .............. 340/825.44–825.48, 340/311.1; 379/56, 57, 142, 40, 58, 63; 455/185, 186, 122

[56] References Cited

U.S. PATENT DOCUMENTS

| 4,010,461 | 3/1977 | Stodolski | 340/825.48 |
| 4,160,240 | 7/1979 | Partipilo | 340/825.44 X |
| 4,382,256 | 5/1983 | Nagata | 340/825.44 |
| 4,385,295 | 5/1983 | Willard et al. | 340/825.44 |
| 4,696,054 | 9/1987 | Tsugei et al. | 340/825.44 X |
| 4,924,496 | 5/1990 | Figa et al. | 379/142 |

Primary Examiner—Ulysses Weldon
Attorney, Agent, or Firm—Philip P. Macnak; Vincent B. Ingrassia; William E. Koch

[57] ABSTRACT

Calls entered into a paging system are processed by a controller which identifies the call source from which the call originates, and from a table of predetermined call sources the controller generates a source tag identifying the call source. The source tag is transmitted together with any caller generated message to a paging receiver. The paging receiver, upon receiving the source tag, selects a predetermined message from a table of predetermined messages, and displays the predetermined message stored within and displays the predetermined message together with the caller generated message. The tables of predetermined call sources and predetermined messages are definable by the paging receiver user.

23 Claims, 5 Drawing Sheets

METHOD AND SYSTEM FOR USER CONTROLLED PAGE DISPOSITION

BACKGROUND OF THE INVENTION

This invention relates to a paging system, a pager therefor and a method of operation of such a system.

SUMMARY OF THE PRIOR ART

Only one method is available in currently produced paging systems for transmitting to a pager any concise information implying the type of a calling source or the priority of the page about to be received. That method is to use a different pager address for each type of source and/or level of priority. There are several difficulties accompanying the use of multiple addresses to convey this descriptive information. For one thing, callers must know and select the appropriate address. For another, multiple addresses require either multiple telephone numbers (which can be expensive) or 'post digit' entry (which can be bothersome) in order to make the selection. In addition to these administration difficulties, the number of different addresses included in a given pager is limited for practical reasons, which to date has restricted functional addressing to controlling only major items such as basic pager response (tone alert, numeric display, alphanumeric display, or voice) and to providing extremely limited information about source and/or priority.

It is an object of the present invention to provide an improved and/or more versatile paging system.

SUMMARY OF THE INVENTION

According to the present invention, there is provided a paging system comprising a paging controller and a plurality of receivers, the controller having means for receiving a call placed by a caller from one of a plurality of call sources, means for identifying the call means for storing a table of predetermined call sources, means for generating a source tag when the identified call source corresponds to one of the predetermined call sources, and source, means for transmitting the source tag. The receiver comprises means for receiving the transmitted source tag, means for storing a table of predetermined messages and predetermined source tags corresponding thereto, means for selecting one of the predetermined messages corresponding to the one predetermined source tag which matches the transmitted source tag, and means for displaying the selected message.

The means for identifying the call source may comprise means for receiving a call-back number provided by an operator at the call source, or in more advanced telephone systems, it may comprise automatic number identification means.

In this manner, a look-up table of telephone numbers of interest can be provided in the paging terminal, the terminal can compare the number of the source of an incoming call with the telephone numbers of interest for the particular pager being paged If a match is identified, the paging terminal can transmit a source code identifier to the pager and the pager can execute a similar, reversed, look-up operation, thus using the source code identifier to generate a message, which is displayed on the display of the paper. The message can, for example, identify the caller.

DETAILED DESCRIPTION OF THE PREFERRED EMBODIMENT

Figure 1:
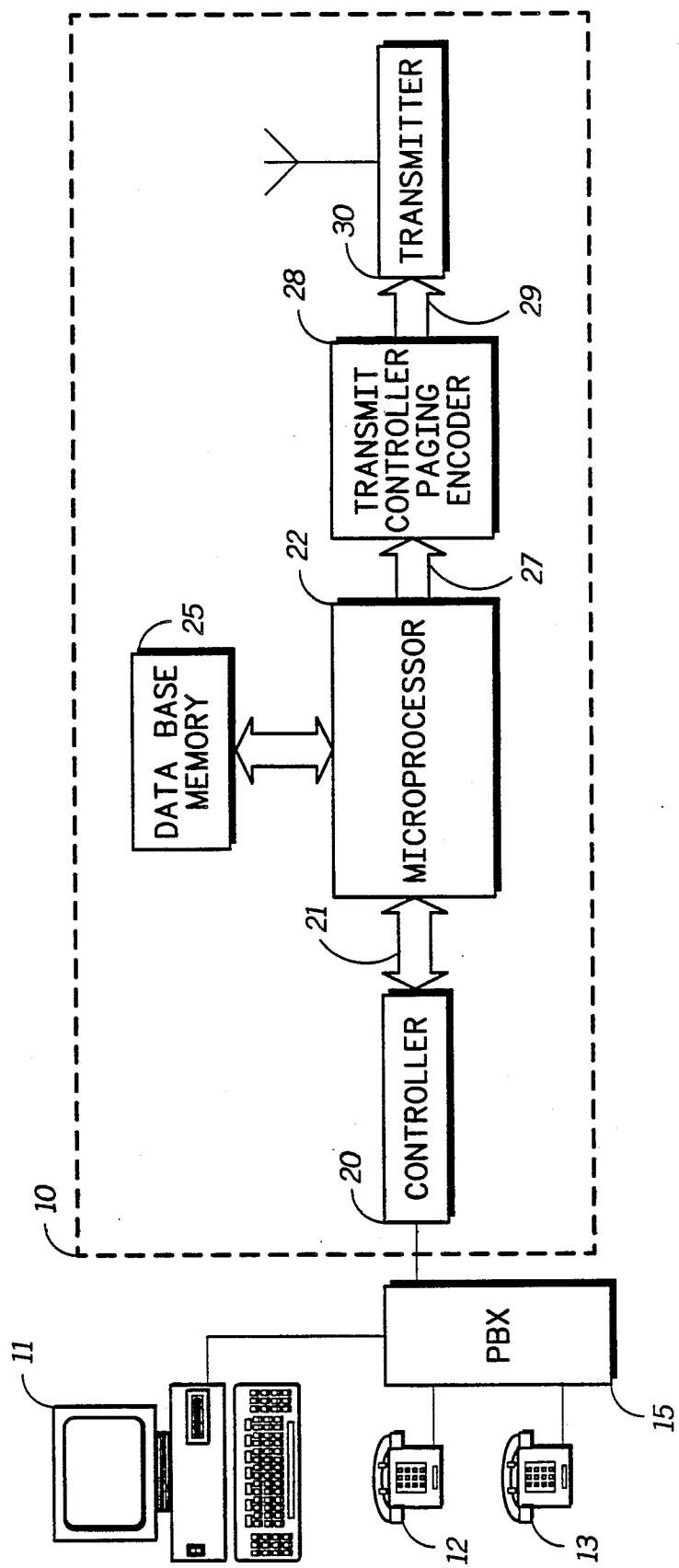
FIG. 1 shows a paging system in accordance with the invention.

Referring to FIG. 1, there is shown a paging terminal 10 connected to sources of paging calls in the form of data terminal 11 (with modem and autodialer) and telephones 12, and 13 etc. The input devices are connected into a public branch exchange PBX 15, which selectively connects them to the paging terminal 10. The terminal 10 communicates into the PBX by means of a controller and supervisor 20, which is connected to a microprocessor 22 via a data bus 21. The microprocessor has a data base memory 25. The microprocessor is connected through data bus 27 to a transmit controller and paging encoder 28 which in turn is connected to a transmitter 30 via data bus 29.

In order to set up the system of the present invention, a set of pager unique, special interest source numbers (telephone numbers) are entered into the data base memory 25 and stored for each subscriber using the system. The source numbers might be, for example, complete telephone numbers such as those assigned to the subscriber's secretary, boss, wife etc., or the numbers might be partial line numbers indicating a generic class of source, such as originating inside a PBX, as opposed to coming from outside. These lists of special interest numbers are entered into the data base for each subscriber via video display terminal (VDT) commands and screens, just as other subscriber data is entered in modern software controlled paging terminals.

The operation of the system is as follows. A caller places a paging call via one of input devices 11, 12, 13 etc., by entering the appropriate commands into the terminal 11 or by lifting the handset of the telephone 12 or 13 and dialing the predetermined number assigned to the paging terminal 10. The PBX 15 routes the call to the terminal 10 When the controller and supervisor 20 determines that a call has been received, the microprocessor 22 issues a prompt message (e.g. a digitized voice prompt in the case of a telephone input device) prompting the user to enter the number of the paging receiver to be paged. After entry of this number (e.g. via a DTMF touch pad in the case of telephone 12 or 13), the microprocessor 22 issues a further prompt, prompting the caller to enter a call-back number and/or any further message. The caller enters his call-back number in the same manner. On receipt of this number, the microprocessor 22 compares the call-back number against the subscriber unique list of numbers in data base 25 associated with the subscriber of the paging receiver which is being paged, and determines whether a match exists with one of these special interest numbers. If a match exists, the microprocessor 22 generates a source tag. The source tag takes the form of two ASCII characters which will be transmitted to the paging receiver together with the call-back number and any further message entered by the caller. If no match is identified, the source tag is set at a predetermined character (e.g. 0) indicating the source as being 'other'. This arrangement allows for 1000 subscriber unique numbers to be programmed into the data base memory 25 for each subscriber.

If the input devices 11, 12, 13 and the PBX 15 provide the facility for automatic number identification, by which is meant that they provide, for every call, an automatic indication of the telephone number of the input device originating a call, then this number can be used by the microprocessor 22 to perform the look-up operation in data base 25.

The manner in which this source tag is utilized by the paging receiver will be described below with reference to FIGS. 2 and 3. In the meantime, there follows a description of the generation of the page descriptor and the functional typer.

A page descriptor is generated by the microprocessor 22 as follows. The page descriptor indicates the basic nature of the page. The basic nature includes, but is not restricted to the following:

(1) Whether or not the page is urgent,
(2) Whether or not the pager requires a call-back and
(3) Whether the page requires action from the recipient or merely contains information.

The determination of the basic nature of the message is determined by text matching as follows.

A page is considered urgent if either the first or the last word of the message is 'urgent'. A page is considered to require a call-back if the first word of the message is 'call', or if the first two words are 'please call'. A page is considered to require action if the first word is 'please', 'call', 'meet', 'come', 'go', 'see', or any other action words as appropriate. A page is considered an informational page if it does not meet the aforesaid action criteria.

The above catchwords are programmed into the data base memory 25 and the microprocessor 22 conducts a page matching operation between the message (if any) to be sent to the paging receiver and each of these catchwords. The catchwords apply to all subscribers, but further catchwords can be programmed to apply to particular subscribers. Thus, a subscriber could program a particular catchword to be temporarily or semi-permanently programmed to provide a page descriptor indicative of an urgent page. An example might be that if the subscriber's wife is expecting a baby, he might program 'hospital' into the paging terminal in order to program any message containing that word to generate an urgent page descriptor.

If a particular basic nature of the message has been identified, the microprocessor 22 generates a character (the page descriptor) indicative of that basic nature This character is a single ASCII character. This allows for up to 256 types of message to be identified, though in practice no more than ten types are likely to be required As for the source tag and the page descriptor, the microprocessor 22 generates a character (the functional typer) indicating whether the incoming message is alphanumeric, numeric, voice or tone-only. This may be done in one of at least two ways. The first is by means of the use of separate subscriber numbers for different functions. The separate numbers may be entered by the person placing the call, or may be generated in accordance with copending U.S. Patent Application Ser. No.(07/323,657) of Breeden et al, assigned to the assignees of the present application, which application is hereby incorporated by reference. The second method is by means of the use of a special DTMF 'control sequence' dialed by the caller e.g. the sequence '*8' to switch from display to voice function The functional typer takes the form of a further single ASCII character, though it will readily be appreciated that it requires only two data bits and could for example be combined with the pager descriptor.

Figure 2:
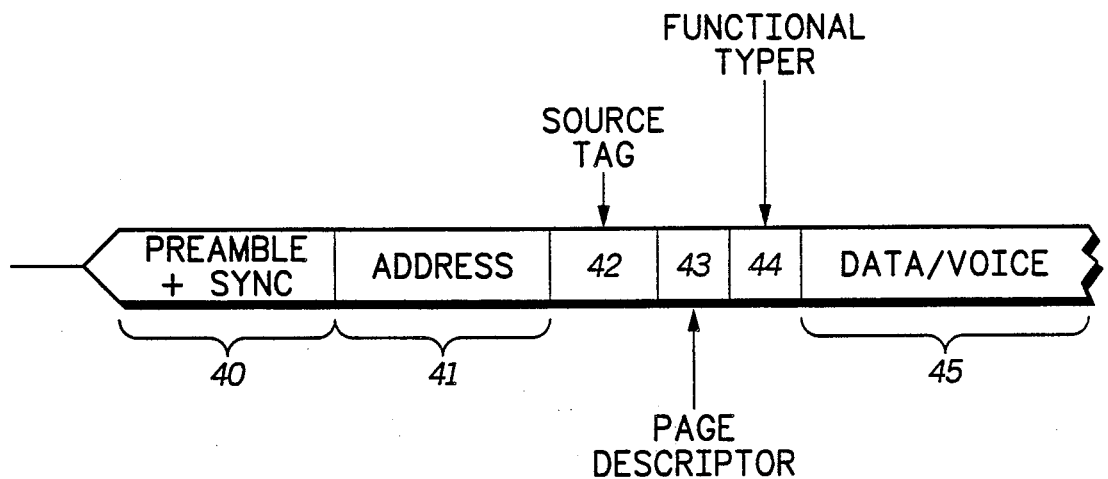
FIG. 2 shows the signal which makes up a typical paging call in accordance with the present invention.

The paging terminal 10 transmits the paging call to the required paging receiver by generating and transmitting the paging call signal shown in FIG. 2. In this figure, it is shown that the paging call signal transmitted comprises a preamble and sync portion 40, followed by the address 41 of the paging receiver in question, followed by the source tag 42, the page descriptor 43 and the functional typer 44. After the functional typer 44, the message is transmitted in the form of data or voice 45.

Figure 3:
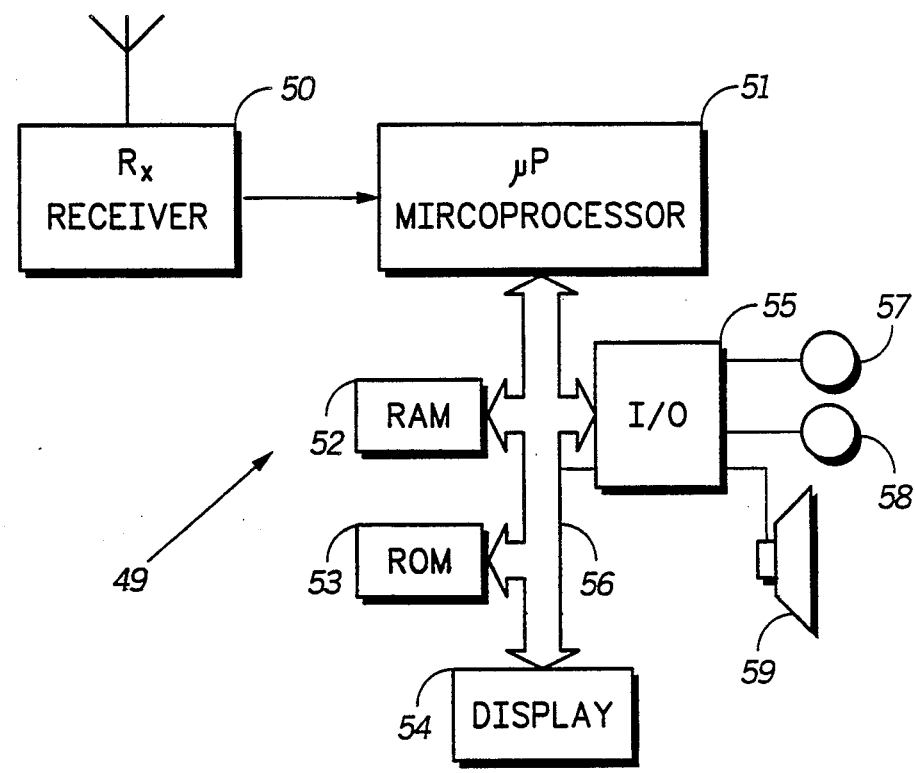
FIG. 3 shows a paging receiver in accordance with the present invention.

The paging call signal of FIG. 2 is received by a paging receiver as shown in FIG. 3. In this figure, it can be seen that the receiver 49 comprises a radio receiver section 50 and a microprocessor 51. RAM and ROM memories 52 and 53, a display 54 and an input/output device 55 are provided, all connected to the microprocessor 51 by means of a data bus 56. Connected to the input/output port 55 are a vibrator 57, an alert LED 58 and a transducer 59. On receipt of the sync portion of the signal 40, the receiver section 50 synchronizes to the incoming signal, in preparation for the receipt of the address 41. On receipt of the address 41, if the microprocessor 51 determines that this address does not match the address of the receiver, no further action is taken. On the other hand, if the address 41 matches the address of the receiver, then the microprocessor 51 receives the remainder of the signal and stores it in RAM memory 52.

Taking the example where the functional typer 44 indicates a data message, the microprocessor 51 utilizes the source tag 42 and the page descriptor 43 as follows The microprocessor 51 performs a look-up operation in ROM memory 53 (which may be EEPROM memory), and extracts from that memory a predetermined message associated with that source tag. A simple example of the usefulness of this feature is that the predetermined message may be a name indicative of the source. Thus, for example, if Mr. Jones as the originator of the call entered his telephone number of as the call-back number and the data base 25 of the paging terminal 10 has Mr. Jones' call-back number preprogrammed therein, then the source tag generated corresponding to the preprogrammed call-back number is transmitted with the caller entered call-back number to the receiver. The receiver upon receiving the source tag performs the look-up operation and the data retrieved through this look-up operation is the same 'Jones'. Thus, the message displayed on display 54 is 'Jones', followed by Mr. Jones' telephone number This has the advantage that, whereas the user of the paging receiver may not immediately recognize the number displayed on the display 54, he is aided in this manner by the supplementing of the number with the name. This concept may be extended in many ways. For example, if a company is receiving unsolicited telephone calls from a particular source, that source could be programmed into the subscriber unique list of numbers and if a subscriber within the company receives a call from that source, the subscriber could be provided with a warning that the call is to be treated with suspicion. This may be more desirable than blocking the call altogether If the source tag is 0, then the message displayed could be 'unknown caller' or the like.

Alternative to, or in addition to generating an additional message on the display 54, the paging receiver can control its alert functions in response to the source tag 42. Thus, if the pager unique special interest source number is the telephone of a senior executive in the user's company, the user can cause the message originated by the senior executive to be treated as urgent. This is done by issuing an immediate audible alert. The immediate alert issued could also be simply vibratory, if so preprogrammed in the paging receiver. For all other, non-urgent, messages, the receiver could respond in a number of ways, including issuing an immediate vibratory alert, together with a visual alert on LED 58, and issuing a further alert at a predetermined later time if the user has not read that message onto the display 54.

The page descriptor 43 is used in a similar manner to control the functions of the pager. These functions may include issuing an immediate alert, including controlling the pitch, duration, volume etc. of the alert, issuing a vibratory or visual alert and/or controlling the status of the message. In this context, 'status' is used to determine such things as how the pager is to issue an alert if the page remains unread for a predetermined period of time, whether or not to protect the page from deletion, whether to continue to protect the message indefinitely, or control the message protection as a function of other factors.

The functional typer 44 determines whether the message 45 is to be displayed on the display 54 or output through the transducer 59. The message may provide both a displayed call-back telephone number (with or without an associated message determined by the source tag 42 and page descriptor 43) and a voice message.

Sending the source tag, page descriptor and the function typer to the paging receiver is simply a matter of encoding the information as would be done for normal display paging characters. This unique control information could be separated from other display data either by virtue of designating a fixed number of characters for control, as shown in FIG. 2 or by using one or more special nonprinting characters as a delimiter. The invention provides an enhancement for paging systems, which is maximized by use of a full featured alphanumeric pager with voice and ack-back capability. When such a pager is designed for user-programmed response to source tag, page descriptor and functional typer information, the pager operation can be highly customized.

There follows a further, specific example of a system in accordance with the invention, for further illustration.

A typical example pager is designed for three user-selectable modes of privacy: 'normal', 'semi-private', and 'private'. the desired privacy mode is selected by using a mode-select button on the pager. For the 'normal' mode the pager responds normally to all pages of all types from all sources, i.e. generating an audible alert informing the user of the receipt of a message. For the other two privacy modes the user can program the pager to respond in virtually any manner he desires. For example, when the 'semi-private' mode is selected, the user might want to disallow all voice pages, and allow all non-voice calls originating from his wife's, secretary's and boss' lines to be normally received, all other calls. In the 'private' mode the user while holding might want to disallow all calls except alphanumeric pages containing information only, or which are marked URGENT, and then only if sourced from his secretary or boss. If the pager were equipped with ack-back capability, then the pager could request the terminal to store, for later telephonic retrieval, all attempted pages (even voice pages) which are disallowed by the heightened-privacy modes. Also, because the pager would be involved in the decision to hold and store each disallowed page, a count of the number of stored pages could be maintained in the pager for later reference. This count could be cleared automatically by the terminal after retrieval of the stored pages.

For programming and reprogramming the pager, two buttons are provided on the pager— one to step through all combinations of source tag, page descriptor, and functional typer for each privacy mode, and the other to select the desired pager response (normal alert, chirp, disallow, etc.) for each combination. The programming mode is entered by depressing both programming buttons together at the same time or by other means. Once programmed, the pager responds as desired in each of the heightened-privacy modes and does not need reprogramming except to modify the desired response.

Figure 4A:
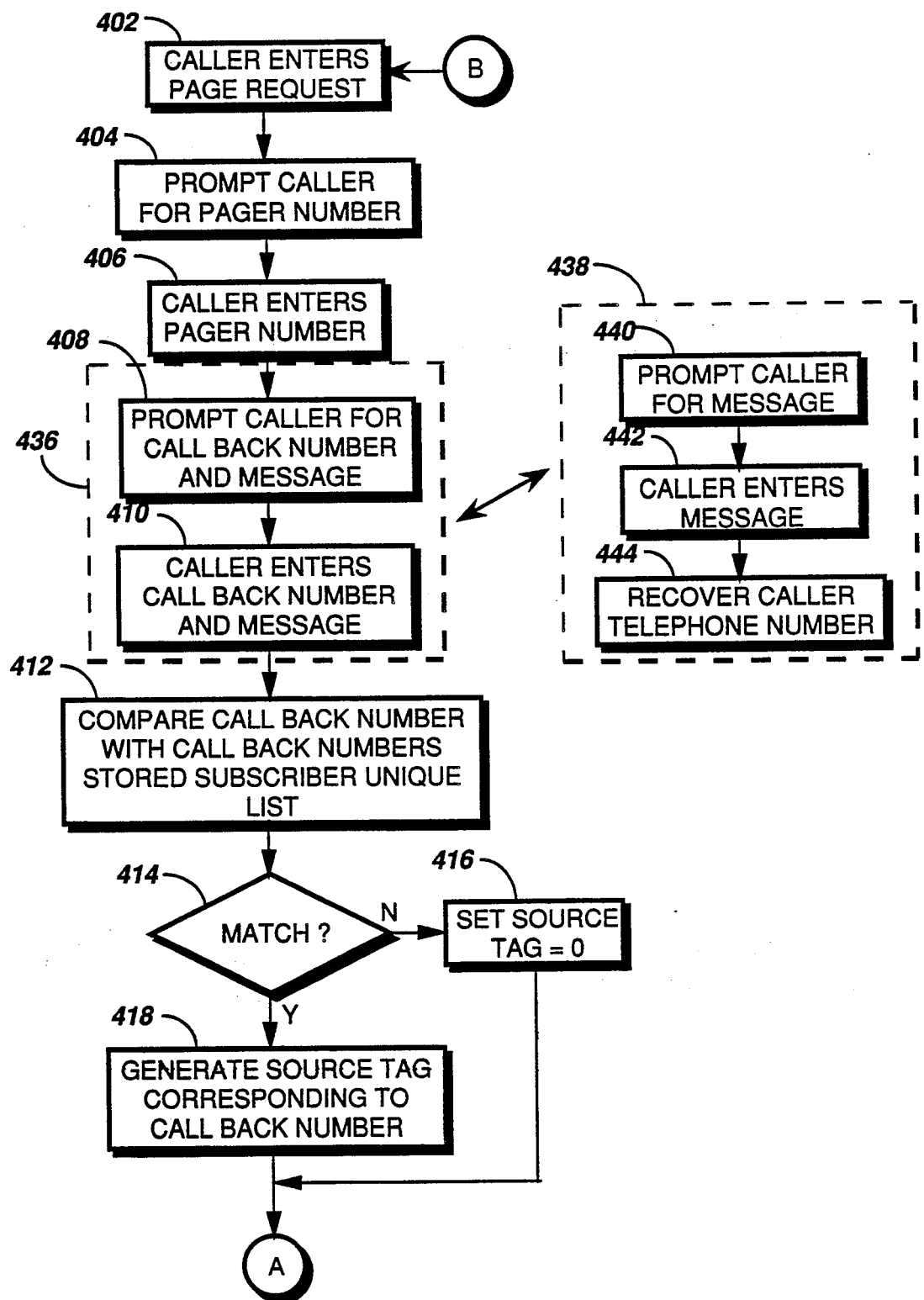
FIGS. 4A and 4B are flow charts describing the operation of the paging terminal in accordance with the present invention.
Figure 4B:
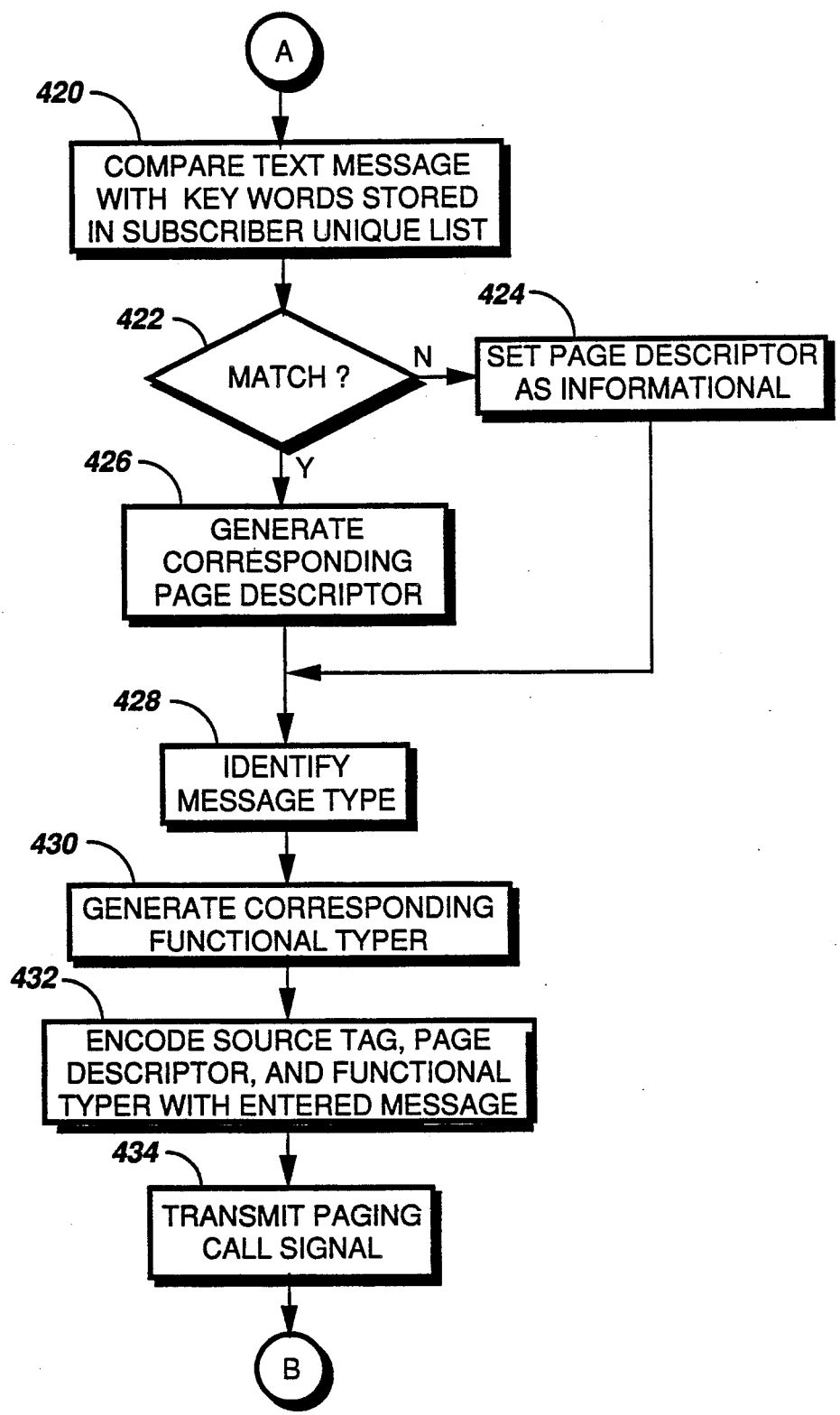

FIGS. 4A and 4B are flow charts describing the operation of the paging terminal in accordance with the present invention. When a caller enters a page request into the paging system, at step 402 of FIG. 4A, the caller is prompted by the paging terminal to enter a pager number, at step 404. The caller enters the pager number, at step 406, and is next prompted by the paging terminal to enter a call-back number at which the caller can be reached, and any message, at step 408. When the page is directed to a numeric display paging receiver, the caller would enter only the call-back number, at step 410. When the page is directed to an alphanumeric display paging receiver, the caller would also enter a message after the call-back number, at step 410. The call-back number entered is compared a table of call-back numbers stored in the subscriber unique list within the paging terminal, at step 412. When the call-back number does not match any of the call-back numbers stored, at step 414, a source tag is set to zero (0), at step 416, indicating there was no match. When the call-back number matches one of the call-back numbers stored, at step 414, a source tag is generated corresponding to the selected call-back number, at step 418. The paging terminal next compares selected words in the message text with a table of key words, also stored in the subscriber unique list, at step 420 of FIG. 4B. When none of the selected words in the message text match any of the key words stored, at step 422, a page descriptor is set to indicate the message being sent is informational in nature, at step 424. When one or more of the selected words in the message text match one or more of the key words stored, at step 422, a page descriptor corresponding to the nature of the message to be sent is selected, at step 426. The paging terminal next identifies the message type, at step 428, and generates a corresponding functional typer, at step 430. The paging terminal next encodes the source tag, page descriptor, and functional typer together with the message entered, at step 432, after which the encoded message is transmitted, at step 434. Thereafter the terminal returns to await for the next page request, at step 402 of FIG. 4A.

When the terminal is configured to include automatic number identification, the caller directed manual entry of the call-back number identified by the steps of block 436 of FIG. 4A, are replaced by the steps identified by block 438. When automatic number identification is provided, the paging terminal prompts the caller to enter the message, at step 440. The caller then enters the message, at step 442, during or after which the call-back number of the caller is automatically recovered, at step 444. Automatic number identification eliminates the need for the caller to enter the call-back number, and as a consequence, reduces the time required to enter a message into the system.

Figure 5:
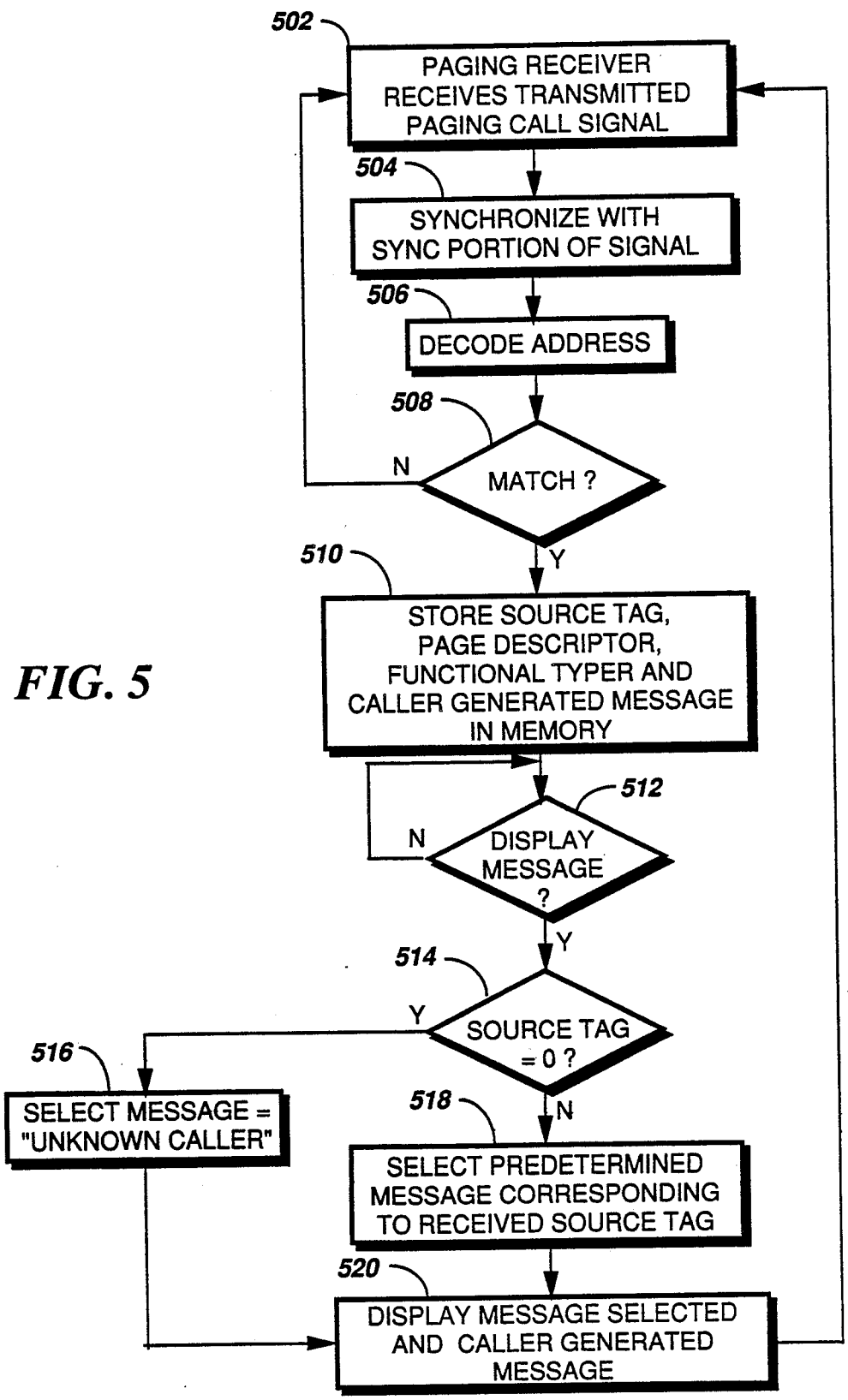
FIG. 5 is a flow chart describing the operation of the paging receiver in accordance with the present invention.

FIG. 5 is a flow chart describing the operation of the paging receiver in accordance with the present invention. The paging receiver receives the transmitted paging call signal, at step 502, and synchronizes with the sync portion of the paging call signal, at step 504, in a manner well known in the art. The decoder section of the paging receiver next decodes the received address portion of the paging call signal, at step 508, in a manner well known in the art. When the received address does not match the address assigned to the paging receiver, at step 508, the paging receiver returns to step 502. When the address received matches the address assigned to the paging receiver, at step 508, the source tag, page descriptor, functional typer and caller generated message are stored in memory for subsequent display, at step 510. When the user requests the message to be displayed, at step 512, the source tag is recovered from memory and checked by the microprocessor, at step 514. When the source tag recovered is a zero, at step 514, the message selected for display with the user generated message indicates the caller is unknown, at step 516. The message selected, such as "unknown caller" and the caller generated message, such as the caller's phone number, are then displayed for review by the user, at step 520. When the source tag recovered is other than a zero, at step 514, indicated the message source was identified, the microprocessor selects the predetermined message from memory which corresponds to the received source tag, at step 518. The selected message, such as "Mr. Jones", and the caller generated message, such as Mr. Jones' phone number, are then displayed for review by the user, at step 520.

I claim:

1. A paging system comprising:
    a paging controller having means for receiving a call placed by a caller from one of a plurality of call sources, means for identifying the call source, means for storing a table of predetermined call sources, means for generating a source tag when the identified call source corresponds to one of the predetermined call sources, and means for transmitting the source tag; and
    a plurality of paging receivers, each comprising means for receiving the transmitted source tag, means for storing a table of predetermined messages and predetermined source tags corresponding thereto, means for selecting one of the predetermined messages corresponding to the one predetermined source tag which matches the transmitted source tag, and means for displaying the selected message.

2. The system of claim 1, wherein said means for identifying the call source comprises automatic number identification means for identifying a call-back number for the call source.

3. The system of claim 1, wherein said means for identifying the call source comprises means for receiving a call-back number provided by the caller.

4. The system of claim 1, wherein the table of predetermined call sources comprises one or more call sources uniquely defined for each paging receiver.

5. The system of claim 1, wherein the table of predetermined messages and predetermined source tags comprises messages uniquely defined by the paging receiver user.

6. The system of claim 1, wherein the call includes a caller generated message intended for said paging receiver, and wherein said means for transmitting transmits the source tag and the caller generated message, and wherein said means for displaying displays the selected message and the caller generated message.

7. The system of claim 6, wherein the caller generated message is a call-back number.

8. The system of claim 6, wherein the caller generated message is an alphanumeric message.

9. The system of claim 8, wherein the alphanumeric message includes a call-back number.

10. A pager for receiver a transmitted paging call signal comprising a caller generated message and a source tag identifying the call source, said pager comprising;
    means for receiving the transmitted source tag and caller generated message;
    means for storing a table of predetermined messages and predetermined source tags corresponding thereto;
    means for selecting one of the predetermined messages corresponding to the one predetermined source tag which matches the transmitted source tag; and
    means for displaying the selected message and the caller generated message.

11. The pager of claim 10, wherein the table of predetermined messages and predetermined source tags comprises messages uniquely defined by the paging receiver.

12. The pager of claim 11, wherein the predetermined messages are paging receiver user definable.

13. The pager of claim 10, wherein the caller generated message is a call-back number.

14. The pager of claim 10, wherein the caller generated message is an alphanumeric message.

15. The pager of claim 14, wherein the alphanumeric message includes a call-back number.

16. A paging system controller for controlling message transmissions to a paging receiver, comprising;
    means for receiving a call placed by a caller from one of a plurality of call sources, the call including a caller generated message;
    means for identifying the call source;
    means for storing a table of predetermined call sources;
    means for generating a source tag when the identified call source corresponds to one of the predetermined call sources; and
    means for transmitting the source tag and the caller generated message to the paging receiver.

17. The paging system controller of claim 16, wherein said means for identifying the call source comprises automatic number identification means for identifying a call-back number for the call source.

18. The paging system controller of claim 16, wherein said means for identifying the call source comprises means for receiving a call-back number provided by the caller at the call source.

19. The paging system controller of claim 16, wherein the table of predetermined call sources comprises one or more call sources uniquely defined for each paging receiver.

20. The paging system controller of claim 19, wherein the predetermined call sources are paging receiver user definable.

21. The paging system controller of claim 16, wherein the caller generated message is a call-back number.

22. The paging system controller of claim 16, wherein the caller generated message is an alphanumeric message.

23. The paging system controller of claim 22, wherein the alphanumeric message includes a call-back number.

* * * * *

UNITED STATES PATENT AND TRADEMARK OFFICE
CERTIFICATE OF CORRECTION

PATENT NO. : 4,994,797

DATED : February 19, 1991

INVENTOR(S) : Robert L. Breeden

It is certified that error appears in the above-identified patent and that said Letters Patent is hereby corrected as shown below:

In the Drawings:
FIG. 3, block 51, delete "mircoprocessor" and insert --microprocessor--.

Column 8, line 3, after "caller", insert --at the call source--.

Column 8, line 23, delete "receiver", and insert --receiving--.

Signed and Sealed this

Eleventh Day of August, 1992

Attest:

DOUGLAS B. COMER

Attesting Officer     Acting Commissioner of Patents and Trademarks